United States Patent [19]
Koledin

[11] Patent Number: 5,839,789
[45] Date of Patent: Nov. 24, 1998

[54] BELT TENSIONER FOR CHILD SAFETY SEAT

[76] Inventor: Emil M. Koledin, 4935 Lakeview Dr., Hermitage, Pa. 16148

[21] Appl. No.: 883,321

[22] Filed: Jun. 26, 1997

[51] Int. Cl.[6] .......................... A47D 15/00; A62B 35/00; B60R 22/34
[52] U.S. Cl. .................. 297/476; 297/468; 297/479; 297/250.1
[58] Field of Search ................. 297/476, 468, 297/479, 250.1

[56] References Cited

U.S. PATENT DOCUMENTS

| | | |
|---|---|---|
| 2,526,216 | 10/1950 | Gartner . |
| 2,991,523 | 7/1961 | Del Conte . |
| 3,402,901 | 9/1968 | Van Houten . |
| 3,826,743 | 7/1974 | Huber . |
| 4,616,141 | 10/1986 | Hollowell . |
| 4,718,696 | 1/1988 | Koide et al. . |
| 4,858,997 | 8/1989 | Shubin . |
| 4,886,315 | 12/1989 | Johnson . |
| 4,913,490 | 4/1990 | Takahashi et al. ................ 297/468 X |
| 4,919,484 | 4/1990 | Bougher et al. . |
| 5,031,962 | 7/1991 | Lee .......................................... 297/479 |
| 5,082,325 | 1/1992 | Sedlack .................................. 297/468 |
| 5,160,186 | 11/1992 | Lee ..................................... 297/476 X |
| 5,286,090 | 2/1994 | Templin et al. ................ 297/250.1 X |
| 5,605,375 | 2/1997 | Friedrich et al. ................... 297/250.1 |
| 5,671,971 | 9/1997 | Koyanagi et al. ................. 297/468 X |
| 5,695,243 | 12/1997 | Anthony et al. ................... 297/468 X |

Primary Examiner—Jose V. Chen
Assistant Examiner—Rodney B. White
Attorney, Agent, or Firm—Thorp, Reed & Armstrong

[57] ABSTRACT

A seat belt tensioning device and a system for tightly positioning a child safety seat within the confines of a vehicle, comprising a belt receiver member and a tensioning means for engaging the belt receiver member and tensioning a seat belt. Operation of the tensioning means causes the seat belt to be tensioned until the child safety seat is embedded and firmly secured within the confines of the vehicle.

17 Claims, 5 Drawing Sheets

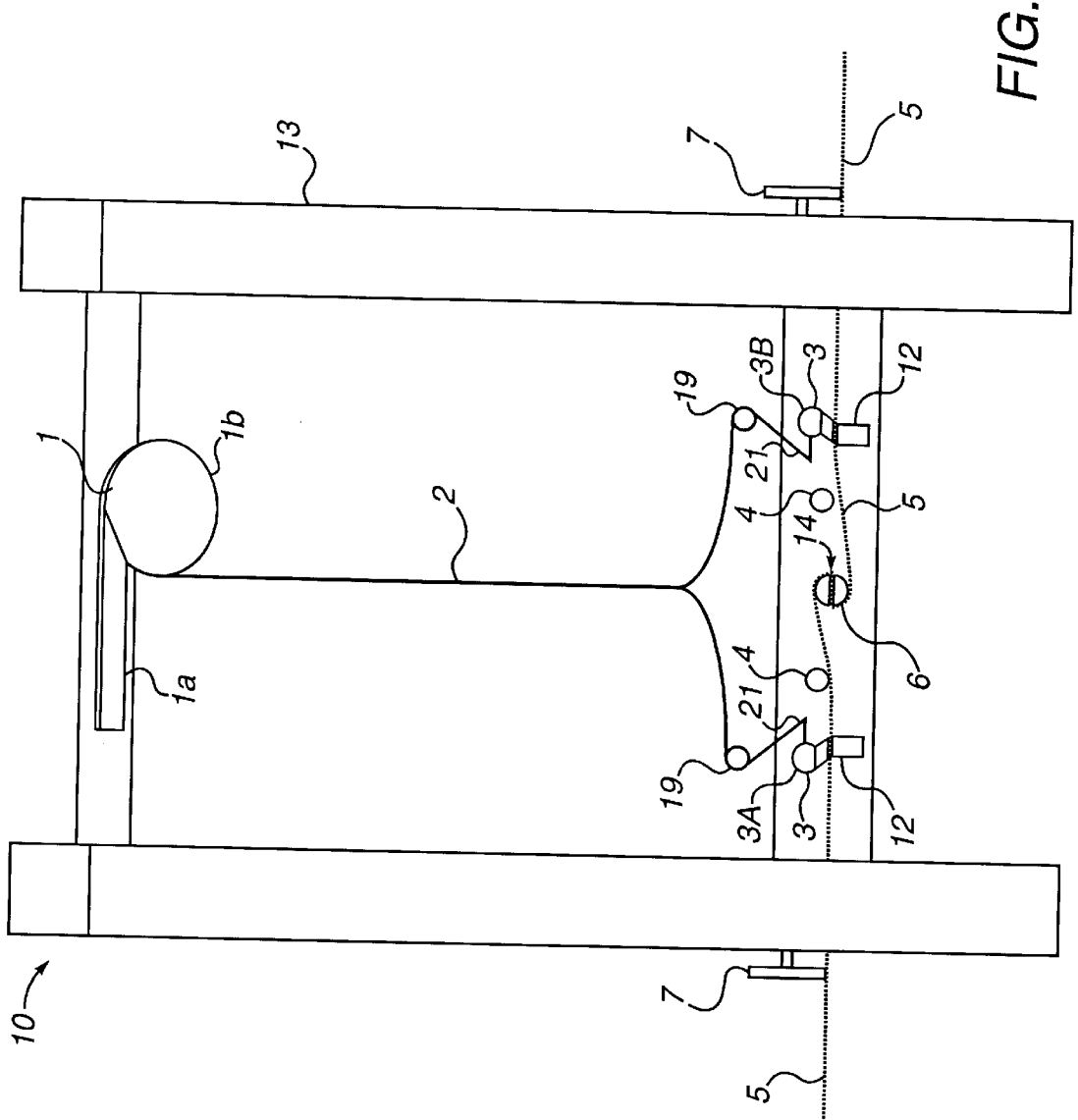

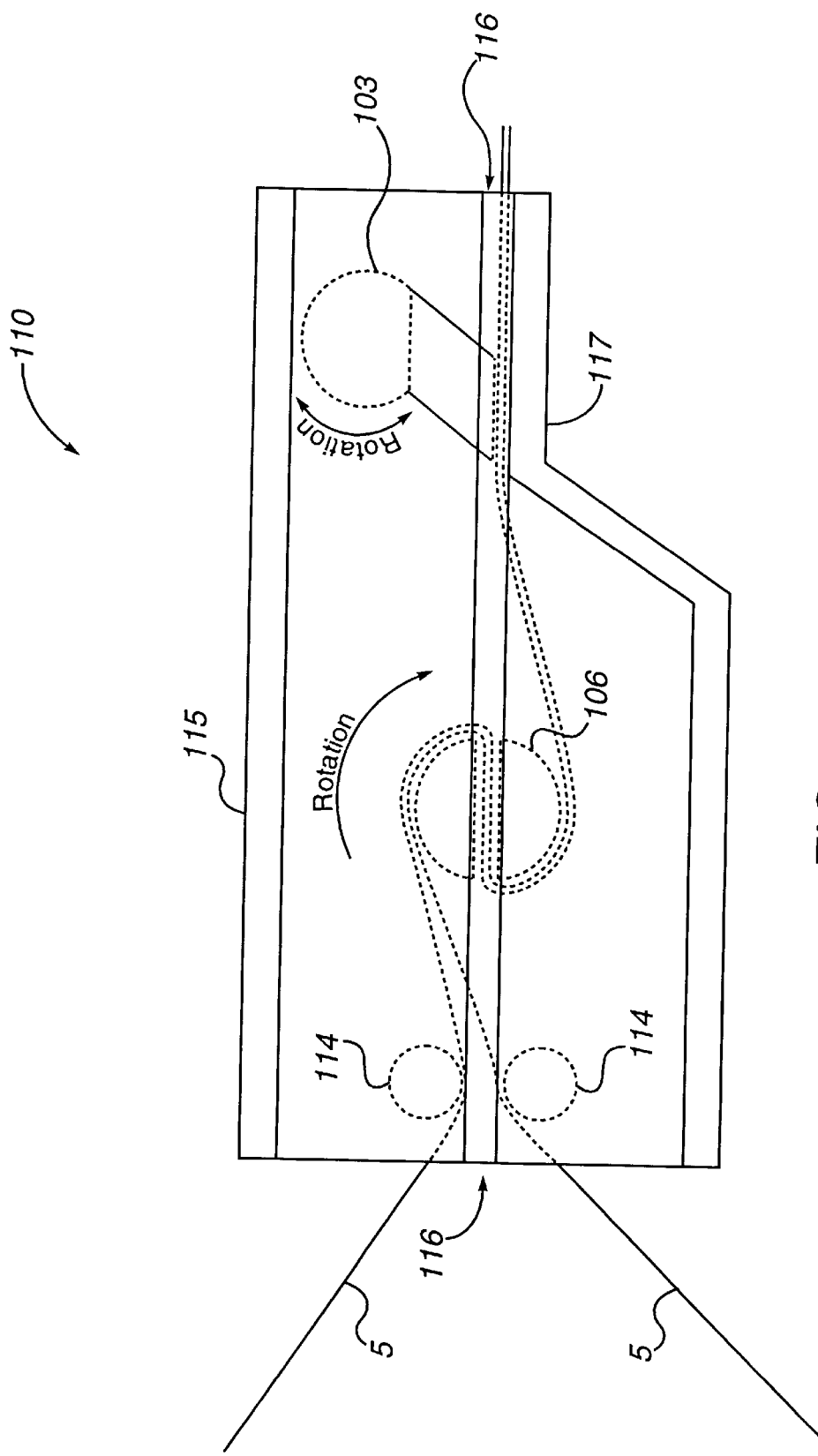

BELT TENSIONER FOR CHILD SAFETY SEAT

FIELD OF THE INVENTION

This invention relates to an easy to use and reliable belt tensioning device and, more particularly, to a new and improved device for tensioning a safety belt so as to adjust the belt length and optimize its effectiveness for tightly securing a child safety seat in an automotive vehicle.

BACKGROUND OF THE INVENTION

A typical vehicle restraint system includes a lap and shoulder safety belt, or a single lap belt, and is utilized in conventional automotive vehicles to restrain the movement of a passenger from a seated position which might result from turning, braking, accident, or any sudden movement of the vehicle. The combination lap and shoulder belt system typically includes a conventional spring-biased inertia locking reel which is designed to allow for the free transfer of belt webbing for ease of adjustment to the wearer, but to firmly lock the seat belt system upon rapid vehicle deceleration. The single lap belt system typically does not include an inertia locking reel.

Generally, the single lap belt system is located in the middle portion of the back seat of a vehicle, with one end of the lap belt firmly attached to the seat, and the other end having an anchor plate with a portion which can be placed into the belt buckle secured to the vehicle in order to anchor the lap belt. The lap and shoulder belt system is, generally, used for all other seat positions which are adjacent to a door, and typically has three mounting portions: one end of the shoulder portion which is attached to an inertia locking retractor; one end of the integral lap portion which is firmly attached at the lower door sill; and the anchor plate which is connected to a looped portion where the shoulder portion meets the lap portion. The shoulder and lap portions are generally part of a continuous webbing looped through a slot in the anchor plate which presents little friction to the belt webbing. As mentioned above, the anchor plate has a portion which can be placed into the belt buckle secured to the vehicle in order to anchor the shoulder and lap belt system thereto so that the wearer is effectively restrained in the event of extreme situations such as an impact. In the alternative, the lap and shoulder belt system may have a lap belt that is separate from the shoulder belt, with each belt having its own anchor plate for securement inside the vehicle.

Recently, laws have been enacted that mandate the use of child safety seats for children under certain age, height and weight requirements. These child restraint laws have produced positive results by way of increased safety awareness for small children. However, a problem has developed whereby improper installation of the child safety seat can result in insufficient securement of the seat to the vehicle, thus creating serious hazards to a child.

The use of the conventional spring-biased inertia reel in combination with a child safety seat has some inherent disadvantages. One distinct disadvantage is in the design of the reel which allows for the creation of slack in the belt after the belt is anchored. As a result, it is often difficult to tightly position the child safety seat within the vehicle, sometimes resulting in the child passenger not being adequately secured within the confines of the seating area upon rapid vehicular stopping, turning, or braking, even if the inertia locking reel properly performs as designed.

In order for the child safety seat to be properly installed with a conventional spring-biased inertia reel seat belt system so that the child safety seat is firmly held into the vehicle interior, the installer is required to feed the anchor plate and looped portion through a framework on the rear of the child safety seat, after which the anchor plate is locked into the belt buckle. The installer is then typically required to climb on top of the child safety seat and, with his or her hand or knee, force the child safety seat between the vehicle seat and the back cushion. The installer must then pull the seat belt tight and, without allowing any slack to develop in the belt, install a conventional metal clip to bind the lap portion and shoulder portion together in order to hold the child safety seat firmly in place.

Climbing on top of the child safety seat is difficult in the back seat of an automobile, especially so if the parent or guardian is large in stature. Furthermore, because there is an enormous amount of tension in the seat belt, installing the conventional metal clip requires great effort and hand strength.

Although not requiring the use of a metal clip, seat belt systems which do not use a spring-biased inertia locking reel, and thus do not allow the free transfer of belt webbing, require the installer to perform many of the same actions, thus similarly making it difficult to tightly position a child safety seat within a vehicle.

For the above reasons, child safety seats too often are improperly installed within automotive vehicles. Failure to properly restrain the child safety seat as such can cause injury or death to the child from impact into the dashboard or other objects inside the vehicle's interior in the event of accidental impact. In addition, other passengers inside the vehicle are at risk of impact from the child safety seat if the safety seat is not properly restrained.

Thus, while seat belt systems fully meet the industry standards to restrain the adult wearer, an additional device is needed to quickly and easily embed and firmly hold a child safety seat in position during normal driving maneuvers and in the event of rapid deceleration.

SUMMARY OF THE INVENTION

The present invention satisfies the above-mentioned need. Generally, the present invention provides for a compact tensioning device and a new system for tensioning a lap belt or a combination lap and shoulder belt system of an automotive vehicle, particularly suited for use with a child safety seat.

The system for tensioning is, in one embodiment, integrally associated with a child safety seat, and preferably comprises a belt receiver member for receiving and engaging a portion of a seat belt, and a tensioning means for engaging the belt receiver member and tightening the seat belt. As the system tensions the seat belt, the child safety seat is embedded in the seat of the vehicle and restrained in position to protect the child.

Another embodiment of the present invention is a seat belt tensioning device which is not integral with a child safety seat, and comprises an outer housing having a slotted opening for receiving a section of the seat belt, a belt receiver member for engaging the section of the seat belt, and a tensioning means for engaging the belt receiver member thereby tightening the seat belt.

Other details and advantages of the present invention will become apparent from the following detailed description of the presently preferred embodiments of practicing the invention.

BRIEF DESCRIPTION OF THE DRAWINGS

In the accompanying drawings, preferred embodiments of the invention and preferred methods of practicing the invention are illustrated in which:

FIG. 1 is a rear view of one embodiment of a seat belt tensioner of the present invention that is integral with a child safety seat.

FIG. 4 is a front view of a second embodiment of the seat belt tensioner of the present invention.

DETAILED DESCRIPTION OF THE PREFERRED EMBODIMENT

Although reference is made for use of the present invention in an automotive vehicle, the present invention is equally suitable for use in buses, trains, planes, or any other means of transportation, or any other situation where the restraint of a child safety seat is desirable. In addition, as described below, the present invention may be integrally associated with a child safety seat or may be separate therefrom. Where the present invention is integral with the child safety seat, a housing containing the internal workings of the device is optional, but is preferably absent. Where the present invention is not integrated into a child safety seat, no particular type, brand or style of child safety seat is necessary, as the present invention preferably is self-contained within a housing and separately attaches to a seat belt.

Unless otherwise specified, the present invention is preferably constructed of metal such as steel or aluminum, but may also be constructed of a resilient material including a plastic material such as polyethylene, polypropylene or the like.

Figure 3:
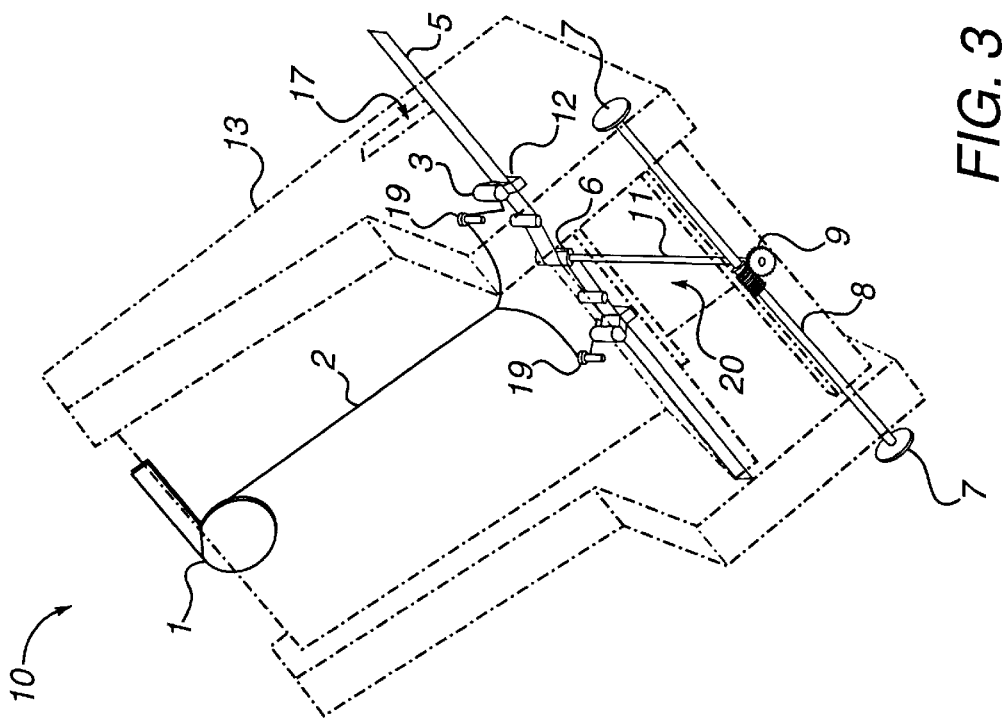
FIG. 3 is a front perspective view of the seat belt tensioner illustrated in FIG. 1.
Figure 2:
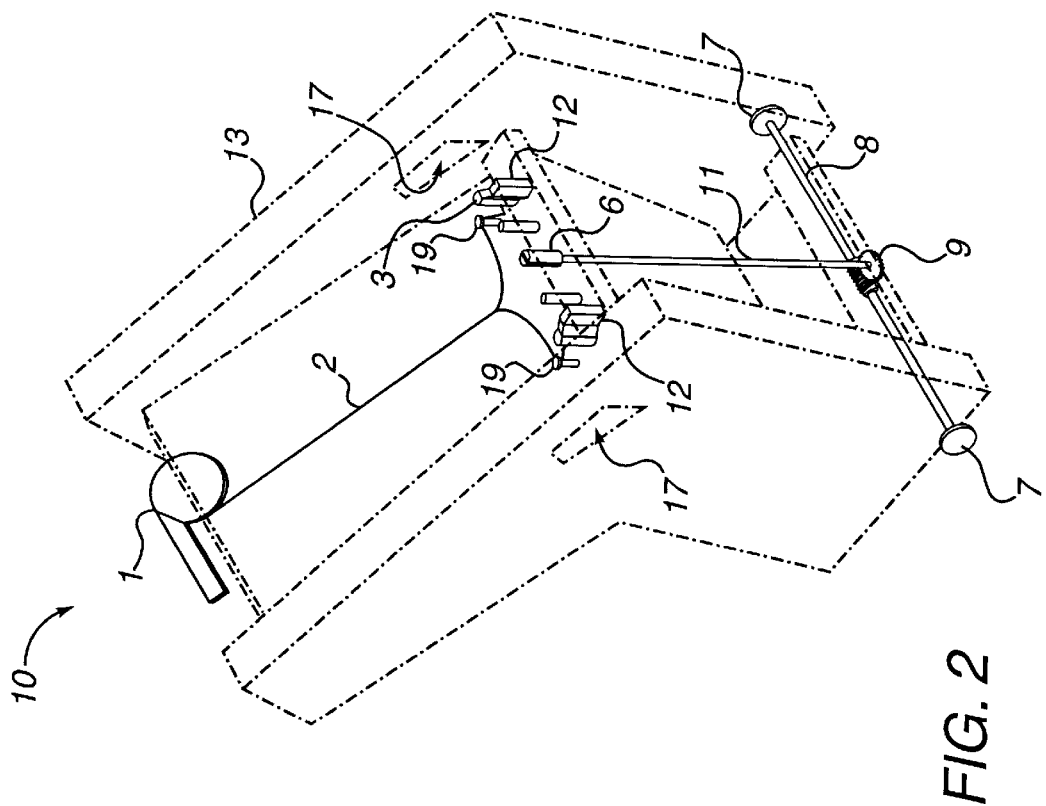
FIG. 2 is a bottom perspective view of the seat belt tensioner illustrated in FIG. 1.

As illustrated in FIGS. 1–3, one embodiment of the present invention is directed to a seat belt tensioner 10 that is integrated into a child safety seat 13, comprising, preferably, a pinch clamp release lever 1 that is attached to a cable 2 which connects to spring biased pinch clamps, generally, 3, with the pinch clamps 3 adjacent to fixed clamp stops 12. Although any number of pinch clamps may be used, preferably, two spring-biased pinch clamps 3A and 3B, similar to those disclosed in my co-pending application Ser. No. 08/716,631, the disclosure of which is incorporated herein by reference, are utilized in opposing relationship. A belt receiver 6 is positioned between belt guides 4, with tensioning means 20 (FIG. 3) operatively engaging belt receiver member 6 to tension the seat belt 5 as the seat belt 5 is fed through apertures 17 in the child safety seat 13. The belt receiver member 6 is preferably a reel structure which, more preferably, includes a split cylinder wind-up reel. As described below, the belt receiver member 6 is in the form of a wind-up reel rotatably mounted on an axis and preferably having a diameter ranging from 2 to 3 inches for holding several wraps of seat belt 5 for length adjustment and tensioning. The tensioning means 20 preferably includes tensioning knob 7, worm drive 8, worm gear 9, and torsion rod 11.

The method for operating the seat belt tensioner 10 of the present invention preferably includes three stages: the pre-tensioning stage; the tensioning stage; and the release stage. In the pre-tensioning stage and the release stage, the pinch clamp release lever 1 operates to allow the seat belt 5 to be inserted and removed, respectively, from the seat belt tensioner 10. FIGS. 1–3 illustrate the release lever 1 in its closed position, with the handle 1a substantially parallel with respect to the top of the child safety seat 13. Pulling the release lever 1 into its open position (a clockwise rotation when viewed in FIG. 1) causes cable 2 to wrap around the substantially circular portion 1b of lever 1, thereby tensioning cable 2 and, via operation of cable guides 19 and cable pins 21, causing the pinch clamps 3 to be rotated into a fully open position. In one embodiment, circular portion 1b of lever 1 includes a recess or groove (not shown) in which cable 2 is wound. The pinch clamp release lever 1 is in its fully opened position (not shown) when the handle 1a of the release lever 1 is substantially perpendicular with respect to the top of the child safety seat 13. The pinch clamp release lever 1 remains in its open position until tensioning is desired.

The pinch clamp release lever 1, when in its open position, operates to fully open the spring biased pinch clamps 3 such that there is sufficient distance between the pinch clamps 3 and the clamp stops 12 for receipt therebetween of a single lap belt or the combination lap and shoulder belt 5. Seat belt 5 may be threaded through an aperture 17 (FIGS. 2 and 3) in either side of the child safety seat 13 and into the seat belt tensioner 10. With the pinch clamps 3 in their open position, the seat belt 5 is, preferably, threaded between the pinch clamps 3 and clamp stops 12, under the preferably fixed belt guides 4, and through the split cylinder belt receiver member 6. The belt receiver member 6 includes a longitudinal slot 14 to receive at least a portion of seat belt 5. The seat belt 5 is then threaded through the other side of the child safety seat 13 via aperture 17, and thereby locked, via the anchor plate, into the belt buckle (not shown). Preferably, in order to insure proper operation of the seat belt tensioner 10, excess slack in seat belt 5 should be eliminated by allowing the inertia wind-up reel, if present, to pull the seat belt 5 snug.

After the seat belt 5 is pulled snug via the wind-up reel, the present invention enters the tensioning stage when the pinch clamp release lever 1 is disengaged into its closed position which allows slack in cable 2, thereby rotating the spring biased pinch clamps 3 into clamping relationship with the seat belt 5. The pinch clamps 3 in the present invention preferably comprise pinch clamps 3A and 3B, which operate similar to the clamps disclosed in my co-pending application Ser. No. 08/716,631, although the pinch clamps 3 preferably act in opposing rotational relationship. When viewed in FIG. 1, pinch clamp 3A rotates in a counterclockwise direction and pinch clamp 3B rotates in a clockwise direction when release lever 1 is disengaged. The clamp stops 12 act in place of a housing and provide a surface against which the seat belt 5 is clamped firmly in place via pinch clamps 3. The pinch clamps 3 rotate into their closed position until the pinch clamps 3 engage the adjacent fixed clamp stops 12, thereby wedging the seat belt 5 therebetween. Any tendency of the seat belt 5 to slip or loosen once the seat belt 5 is positioned within the seat belt tensioner 10 is resisted by the closed pinch clamps 3 which wedge progressively tighter against the seat belt 5 and the fixed clamp stops 12 as the magnitude of external forces pulling against the seat belt 5 is increased. Preferably, opposing pinch clamps 3 are provided in order to prevent slippage of the seat belt 5 from either direction of the child safety seat 13, depending on which side of the vehicle the child safety seat 13 is installed.

Positioned in opposing relationship, the pinch clamps 3 permit the seat belt 5 to be pulled inside the seat belt tensioner 10 and tensioned by the belt receiver member 6 as the belt receiver member 6 is operatively engaged by the tensioning means 20, but do not permit the seat belt 5 to loosen by an external force pulling against the seat belt 5.

Although unnecessary, if a housing is included with this embodiment, it is contemplated that the pinch clamps 3 may clamp the seat belt 5 directly against a wall of the housing (not shown), rather than utilizing fixed clamp stops 12.

The purpose of the pinch clamps 3 is twofold. First, when the combination shoulder and lap belt is used, the pinch clamps 3 prevent the seat belt 5 from slipping around the looped portion of the anchor plate which would otherwise allow slack to develop in the seat belt tensioner 10. Depending on the belt direction (i.e. the side of the safety seat 13 through which the seat belt 5 is fed), one clamp 3 is active while the other clamp 3 is redundant. Second, the opposing pinch clamps 3 act as a precautionary safety backup should the belt receiver member 6 disengage for any reason. In this mode, both pinch clamps 3 would function to lock the seat belt 5 in place when an external force acting in either direction attempts to pull the seat belt 5 from the seat belt tensioner 10.

After the pinch clamps 3 are rotated into their closed position, the belt receiver member 6 is engaged by a tensioning means 20 to tension the seat belt 5 that is threaded through slot 14 in order for the child safety seat 13 to be tightly positioned within the confines of the vehicle. Although any conventional tensioning means may be utilized, the tensioning means 20 of the present invention preferably imparts rotational movement to the belt receiver member 6, and, as shown in FIGS. 2 and 3, preferably includes tensioning knobs 7, a worm drive 8, a worm gear 9, and a torsion rod 11. Rotating either of the tensioning knobs 7 rotates worm drive 8 which engages worm gear 9, which rotates torsion rod 11, thereby rotating the belt receiver member 6. The direction of rotation of the tensioning knob 7 is irrelevant, as tensioning will occur by rotating the tensioning knob 7 in either a clockwise or counterclockwise direction. Rotating the tensioning knob 7 rotates the belt receiver member 6 thereby tensioning the seat belt 5, as described below, until the desired tension is obtained.

When the combination lap and shoulder belt 5 is utilized in the present invention, rotation of the belt receiver member 6 through one full revolution holds the seat belt 5 against slippage by virtue of a tension load acting on the lap and shoulder belts. As the seat belt 5 wraps around the belt receiver member 6, pressure is created, thereby tightly securing the lap and shoulder belts to belt receiver member 6 by frictional engagement.

After the seat belt 5 makes a full revolution around the belt receiver member 6, both pinch clamps 3 become redundant and only act as a precautionary backup in case of belt receiver member 6 disengagement, as described above. The seat belt 5 can be adjusted to the desired tension by continuing to rotate the tensioning knob 7 until the child seat 13 is securely embedded in place within the confines of the vehicle.

To release the child safety seat 13 from its tensioned position, the pinch clamp release lever 1 is pulled into its open position (a clockwise rotation when viewed in FIG. 1), which rotates the pinch clamps 3 up and away from a clamping relationship with the seat belt 5 as described above. The tensioning knob 7 is then rotated in a direction opposite that which was chosen to tension the seat belt 5 until the belt receiver member 6 is rotated back to its original position which allows the seat belt 5 to be unrestrained by the belt tensioner 10. The vehicle belt buckle is then unlocked, and the seat belt 5 is withdrawn from the seat belt tensioner 10 whereby the safety seat may be removed from the vehicle.

It is contemplated that belt tensioning in this embodiment may be induced using a screw drive (not shown) in lieu of the split cylinder belt receiver member 6. A cantilevered arm attached to a screw drive could ride up and down along the back of the seat 13. In its lowest position, the arm would be below the location provided in seat belt tensioner 10 for the seat belt 5. As the arm is raised, it would pull the seat belt 5 upward, between belt guides, thereby increasing belt tension and firmly securing the child safety seat 13 within the confines of the vehicle.

Figure 6:
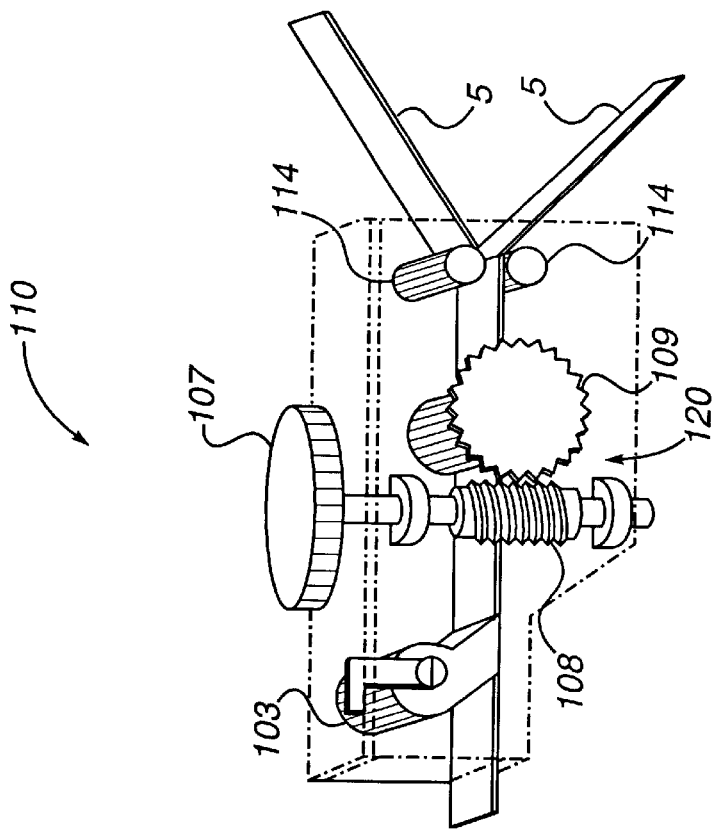
FIG. 6 is a rear perspective view of the seat belt tensioner illustrated in FIG. 4 with the housing removed.

FIGS. 4–7 illustrate an alternate embodiment of the present invention which may be manufactured and attached to a lap belt or combination lap and shoulder belt 5 apart from the child safety seat in a manner that is similar to that shown in my co-pending application Ser. No. 08/716,631, in lieu of a conventional metal clip. Shown is seat belt tensioner 110 which preferably includes a housing 115 containing a spring-biased pinch clamp 103 and preferably fixed belt guides 114 which are positioned in close proximity to each other and belt receiver member 106. The housing 115 contains a side slot 116 extending through the length thereof for receipt of the seat belt 5 for engagement with the tensioning device 110. As best seen in FIG. 6, the belt receiver member 106 is operatively connected to a tensioning means 120 which preferably includes a worm drive 108, a worm gear 109, a torsion rod 111, and a tension knob 107.

As illustrated in the drawings, the design of the belt tensioner 110 is similar to the first embodiment described above, but for some minor variation. First, the alternate embodiment may include a housing 115 containing the same preferred elements described above in connection with the first embodiment. In order to provide for a more compact tensioning device, however, the alternate embodiment preferably includes only belt receiver member 106, tensioning means 120, a single pinch clamp 103, and belt guides 114 contained within housing 115. The single pinch clamp 103 provides the clamping force needed to secure the seat belt 5, while also limiting the size of the belt tensioner 110 to provide for easy handling. As only one spring-biased pinch clamp 3 is present, however, the seat belt 5 is secured within the tensioning device 110 in only one direction as shown in FIGS. 4 and 6.

The pinch clamp 103 may operatively engage the seat belt 5 by any conventional means, but is preferably rotated into place by a spring-biased thumb latch as shown in my co-pending application Ser. No. 08/716,631. Depression of the thumb latch causes the pinch clamp to rotate up and out of the way thereby allowing insertion of the seat belt 5. The seat belt 5 is threaded through the side slot 116, which is preferably aligned such that the seat belt 5 is positioned between the belt guides 114, under the pinch clamp 103, and through the belt receiver member 106. Release of the thumb latch rotates the pinch clamp 103 into clamping relationship with the belt 5, thereby securing the seat belt 5 in place in order for tensioning to occur (FIG. 6). The pinch clamp 103 may engage the seat belt 5 against a fixed clamp stop (not shown), as described above in connection with the first embodiment, but preferably clamps the seat belt 5 against a wall 117 of the housing 115.

Figure 5:
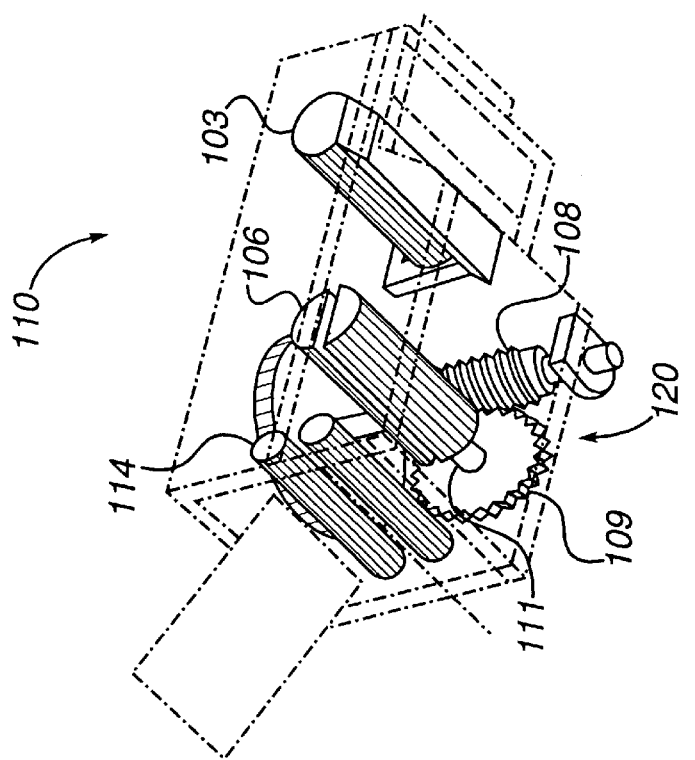
FIG. 5 is a front perspective view of the seat belt tensioner illustrated in FIG. 4 with the housing removed.
Figure 7:
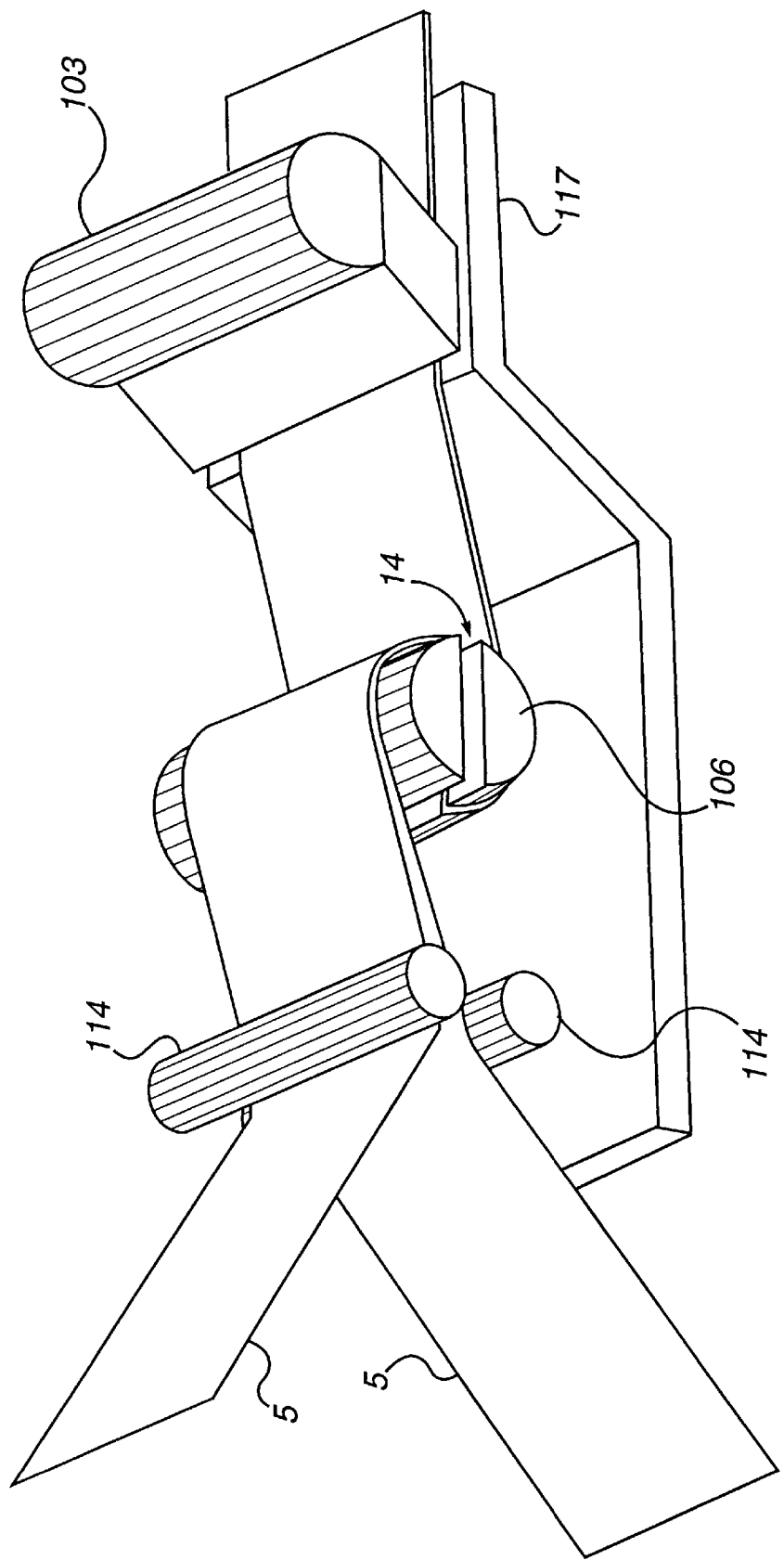
FIG. 7 is another front perspective view of the seat belt tensioner illustrated in FIG. 4 with a portion of the housing removed.

As illustrated in FIGS. 5 and 6, the tensioning means 120 preferably includes, within the housing 115, worm drive 108, worm gear 109, and torsion rod 111 which are operatively connected to the tensioning knob 107 which preferably is positioned outside the housing 115. As described above, tensioning the seat belt 5 preferably involves rotation of the tensioning knob 107 thereby engaging the worm drive 108 and worm gear 109, thereby rotating the torsion rod 111, which acts to rotate the belt receiver member 106 and to tension the seat belt 5 threaded therethrough as described above in connection with the first embodiment.

It is contemplated that the worm drives 8, 108 and worm gears 9, 109 for both the first and second embodiments, respectively, could be replaced with a ratcheting mechanism (not shown). A knob or lever would rotate a torsion rod and the ratchet and pawl of the ratcheting mechanism would hold the rod under torsion, allowing faster operation and release. A worm drive assembly is preferred as it provides greater mechanical advantage, thus requiring less strength, and results in lower failure potential.

It is also contemplated that the tensioning means 20, 120 for both the first and second embodiments, respectively, could be detachably engaged using a small electric motor (not shown) in place of the tensioning knobs 7, 107. The motor could be powered, for instance, by the vehicle battery via the cigarette lighter. Also, an electrically powered system could automatically engage/disengage the pinch clamps 3, 103 and provide a consistent belt tension.

Although the invention has been described in detail in the foregoing for the purpose of illustration, the present invention is only described with respect to the preferred physical embodiments constructed in accordance herewith. It will be apparent to those of ordinary skill in the art that various modifications and improvements may be made without departing from the scope and spirit of the invention. Accordingly, the invention is not limited by the specific embodiments illustrated and described, or objects or advantages thereof, but only by the scope of the appended claims, including all equivalents thereof.

I claim:

1. An apparatus for securely fastening a child safety seat within a vehicle having a seat belt, the apparatus comprising:
    a belt receiver member for engaging a first portion of the seat belt;
    a tensioning device, said tensioning device operatively engaging said belt receiver member for imparting a rotary motion thereto for tensioning the seat belt;
    a pinch clamp positioned along the direction of travel of said belt for clamping a second portion of the seat belt; and
    a clamp release lever operatively connected to said pinch clamp.

2. The apparatus of claim 1, additionally comprising a second pinch clamp positioned along the direction of travel of said belt but in opposite functional relationship to said pinch clamp, said second pinch clamp for clamping a third portion of the seat belt, and wherein said clamp release lever is operatively connected to said second pinch clamp.

3. The apparatus of claim 2, wherein said release lever is operable between an open and a closed position.

4. The apparatus of claim 3, further comprising first and second fixed clamp steps against which the second and third portions of the seat belt are clamped by said two pinch clamps, said first and second pinch clamps being in a biased relationship with said release lever, said first and second pinch clamps positioned adjacent to said first and second fixed clamp stops, respectively, whereby a first slot is formed between said first pinch clamp and said first clamp stop, and a second slot is formed between said second pinch clamp and said second clamp stop, said first and second slots being of sufficient size to receive the second and third portions, respectively, of the seat belt, whereby the portions of the seat belt are clamped relative to said pinch clamps and said clamp stops when said release lever is in said closed position.

5. The apparatus of claim 4 wherein said first pinch clamp and said first clamp stop are positioned opposite said second pinch clamp and said second clamp stop relative to said belt receiver member.

6. The apparatus of claim 1, wherein said belt receiver member is a split cylinder wind-up reel.

7. The apparatus of claim 1, wherein said tensioning device comprises at least one tensioning knob in operative relationship with said belt receiver member.

8. The apparatus of claim 7, wherein said tensioning device further comprises a worm drive assembly operatively connected to said at least one tensioning knob and said belt receiver member, whereby rotation of said at least one tensioning knob operates said worm drive assembly thereby rotating said belt receiver member.

9. A tensioning device for tensioning a seat belt, comprising:
    a housing having at least one slotted opening for receiving a portion of the seat belt;
    a belt receiver member comprising a split cylinder wind-up reel positioned within said housing for engaging the portion of the seat belt; and
    a means for tensioning, said tensioning means operatively engaging said seat belt receiver member for tensioning said seat belt.

10. The tensioning device of claim 9, wherein said tensioning means includes at least one tensioning knob in operative relationship with said split cylinder wind-up reel.

11. The tensioning device of claim 10, wherein said tensioning means further comprises a worm drive assembly operatively connected to said at least one tensioning knob and said split cylinder wind-up reel, whereby rotation of said at least one tensioning knob operates said worm drive assembly thereby rotating said split cylinder wind-up reel.

12. The tensioning device of claim 11 further comprising means for clamping the portion of the seat belt to a portion of said housing, said means for clamping being positioned within said housing.

13. The tensioning device of claim 12 further comprising means for biasing said clamping means into and out of clamping relationship with the portion of the seat belt, said means for biasing being operatively connected to said clamping means.

14. The tensioning device of claim 13, wherein said clamping means comprises one pinch clamp.

15. A method for tensioning a seat belt such that a child safety seat is tightly positioned within the confines of a vehicle comprising the steps of:
    positioning the child safety seat inside the vehicle;
    placing the seat belt in associative engagement with the child safety seat;
    positioning the seat belt within a pelt receiver member;
    clamping a portion of the seat belt in a one-way pinch clamp; and
    rotating said belt receiver member thereby tensioning the seat belt securely within the vehicle.

16. The method for tensioning of claim 15 wherein the step of positioning the seat belt within a belt receiver member includes the step of positioning the seat belt in a split cylinder wind-up reel.

17. The method for tensioning of claim 16 wherein the step of operatively engaging includes the step of operatively engaging a worm drive assembly with at least one tensioning knob and said split cylinder wind-up reel, whereby rotation of said at least one tensioning knob operates said worm drive assembly thereby rotating said split cylinder wind-up reel.

* * * * *